Feb. 25, 1969  L. P. ROSELL  3,429,448
SEPARABLE COUPLING

Filed May 9, 1966  Sheet 1 of 2

INVENTOR.
LESTER P. ROSELL
BY
*Melvin A. Crosley*

Feb. 25, 1969  L. P. ROSELL  3,429,448
SEPARABLE COUPLING

Filed May 9, 1966  Sheet 2 of 2

INVENTOR.
LESTER P. ROSELL
BY
Melvin A. Crosley

United States Patent Office 3,429,448
Patented Feb. 25, 1969

3,429,448
SEPARABLE COUPLING
Lester P. Rosell, Dayton, Ohio, assignor to Emco Wheaton, Inc., Dayton, Ohio
Filed May 9, 1966, Ser. No. 548,632
U.S. Cl. 210—445                                 6 Claims
Int. Cl. B01d 35/02; F16l 27/08

ABSTRACT OF THE DISCLOSURE

Separable swivel coupling in which two parts of the coupling telescopically engage and have registering annular grooves with a spring ring of substantial cross section disposed in the outer groove and adapted for being compressed radially so that a radial portion of the ring is disposed in each groove to hold the parts together while permitting swivelling motion thereof.

---

This invention relates to a swivel coupling which includes a strainer body member and a threaded member for receiving a hose with the said members being swivelly but detachably interconnected.

In the dispensing of fluids such as fuels, oils and various chemicals and the like, it is convenient for the fluids to be retained in container which may be in the form of stationary tanks or which may be in the form of tank trucks or the like.

The dispensing of the fluids is frequently done by the use of hoses and the nature of a hose is such that it is of advantage for the hose to have a swivel connection with the container.

It is furthermore the case that such fluids often require straining through a suitable screen or the like and it is also necessary, therefore, occasionally to have access to the screen or strainer for cleaning purposes.

Still further, the screen or strainer is advantageously supported in a stationary body member whereas the member that receives the hose end is preferably swivellable and the connection of the swivelling member to the stationary member form a convenient region of separation of the system so that detachable connecting means at this point is of importance. However, the weight of the hose on the interconnected members is substantial and it is also important that the two members be firmly interconnected while permitting the swivelling member to rotate on the stationary member so that, advantageously, the connection between the members also serves as a thrust bearing.

With the foregoing in mind, it is a primary object of the present invention to provide a novel arrangement for interconnecting two members to provide a firm, secure interconnection therebetween while permitting easy assembly of the members.

A still further object of this invention, is a provision of a readily detachable connection between two members, at leas tone of which is adapted for swivelling or rotating movement, in which the interconnecting means serves also as a thrust bearing between the members.

A still further object of the present invention, is the provision of an arrangement for simultaneously interconnecting two relatively rotative members while also serving as a thrust bearing between the two members in which the connection between the members is secure and forms a substantially positive interconnection therebetween but which connection can easily be opened up to permit separation of the members.

A particular object of the present invention, is the provision of a connecting arrangement of the nature referred to which is simple and inexpensive to manufacture but which has long life.

A still further object of this invention is the provision of a connecting arrangement of the nature referred to which is easily manipulated manually but forms quite a positive connection between the two said members when the connection has once been established.

It is also an object of this invention to provide an interconnecting arrangement of the nature referred to in which a minor amount of machine work is required on the members to be interconnected for receiving the connecting arrangement.

The foregoing objects and advantages as well as still other objects and advantages of the present invention will become more apparent upon reference to the following detailed specification taken in connection with the accompanying drawings in which.

Figure 1:
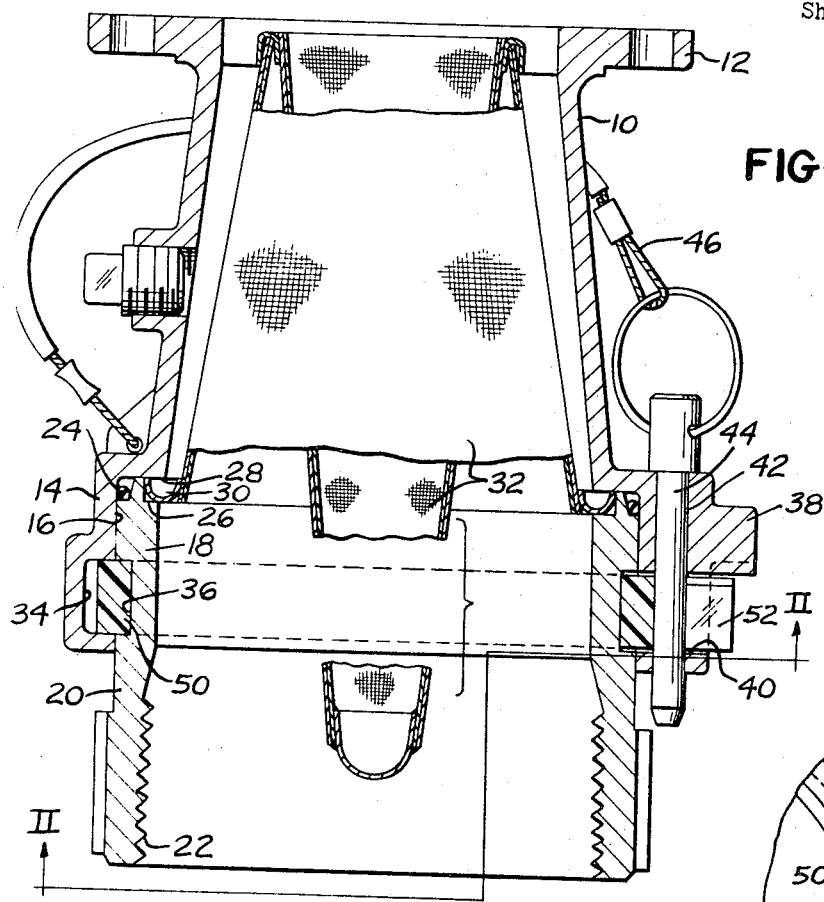
FIGURE 1 is a vertical sectional view through a swivel type coupling strainer device according to the present invention and is indicated by line I—I on FIGURE 2.

Referring to the drawings somewhat more in detail, the coupling according to the present invention comprises an adapter body member 10 which, by virtue of the bored flange means 12, is adapted for connecting to a tank fitting or to the outlet side of a control valve or the like. Adapter 10, at its end opposite bored flange 12, has an enlarged cylindrical portion 14 with a cylindrical bore 16 therein. Cylindrical bore 16 is adapted for receiving cylindrical end part 18 of a fitting member 20 which, by virtue of the threads 22 therein, is adapted for receiving the threaded end of a hose or of a conduit.

The extreme upper end portion 18 of fitting 20 is notched on the outside for receiving a sealing O ring 24 so that, when the fitting 20 and adapter 10 are placed together, as shown in FIGURE 1, the O ring 24 provides a fluid tight seal therebetween.

The inner side of the extreme upper end of cylindrical portion 18 of fitting 20 is also notched as at 26 and this notch, together with the under side of shoulder 28 at the bottom of cylindrical recess 16 in adapter 10, provides means for holding captive the annular ring 30 on which is mounted the screen or strainer means 32 is in the form of a first truncated conical element and a second inverted conical element connected thereto so that, even though the screen or strainer is of relatively light material, it is resistive to the forces acting thereon due to fluid flow through the adapter and likewise presents a large strainer area to the fluid.

The cylindrical bore 16 of adapter 10 is provided with an annular groove 34 therein that opens radially inwardly and the cylindrical portion 18 of fitting 20 is similarly provided with an annular groove 36 which opens radially outwardly. When the fitting 20 is assembled with adapter 10, the said grooves register with each other.

Figure 2:
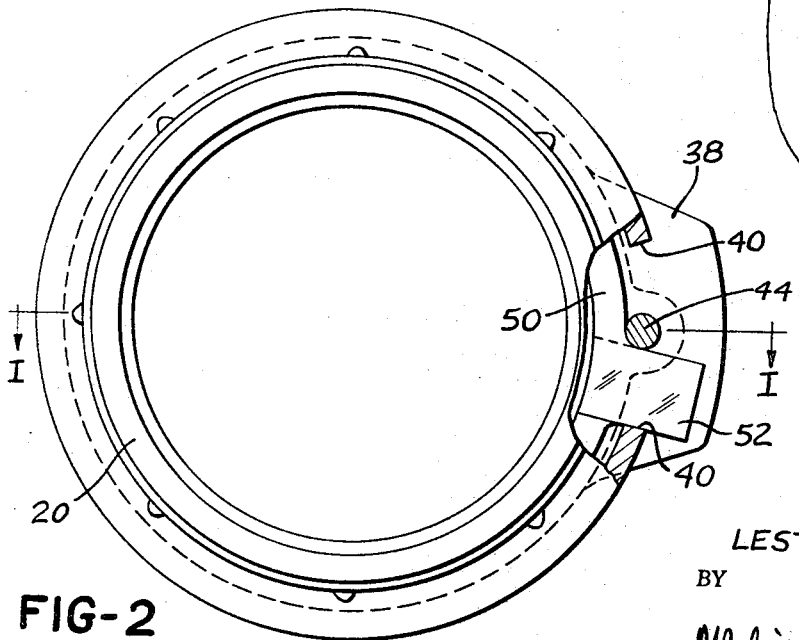
FIGURE 2 is a view looking up from beneath the arrangement of FIGURE 1, partly in section, and is indicated by line II—II on FIGURE 1.
Figure 3:
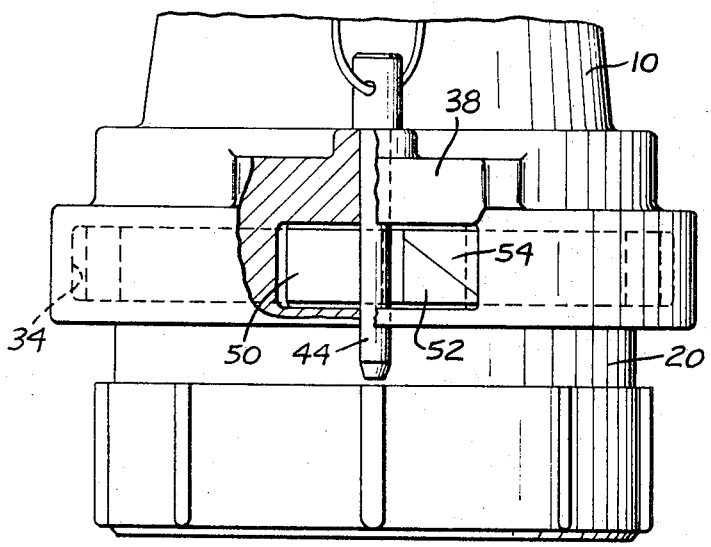
FIGURE 3 is a view partly broken away looking in from the right side of FIGURE 1.

As will best be seen in FIGURES 2 and 3, the end portion of adapter 10 protrudes outwardly at one side, as indicated by reference numeral 38, and beneath the protruding portion 38 of the adapter there is a circumferentially elongated aperture 40 communicating with groove 34 of the adapter. In about the center of the peripheral extent of aperture 40, the adapter is provided with bore means 42 adapted for receiving a pin 44 which may be retained on the adapter as by the flexible cable element 46. As will be seen in FIGURE 1, pin 44 is adapted to extend in the axial direction completely across aperture 40 and to be supported on both axial sides of aperture 40 by the adapter.

The described arrangement is availed of for swivelly interconnecting adapter 10 and fitting 20 so that these two members, namely, the adapter on the one hand and the fitting on the other hand, are securely interconnected but whereby they can swivel relative to each other. Of particular advantage is the fact that the element which interconnects the members not only prevents the members from being separated while in connecting position but also serves as a thrust bearing between the members so that they can swivel freely relative to each other.

Figure 6:
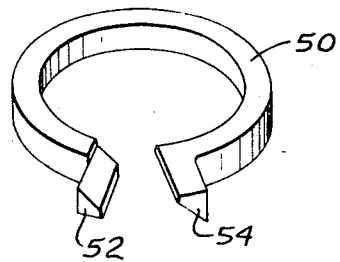
FIGURE 6 is a perspective view showing the coupling element in open position.
Figure 7:
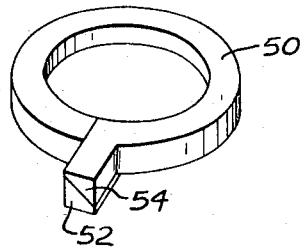
FIGURE 7 is a perspective view showing the coupling element in closed position and with its ends drawn together.

The connecting element that serves to interconnect the said members will be seen in perspective in FIGURES 6 and 7. This element is in the form of a resilient ring 50 having turned out end parts 52 and 54 at its ends. Ring 50 is split, like a piston ring and the resilience of ring 50 is in reference to its radial expansibility and contractibility.

The end parts 52 and 54 are complementarily bevelled for engagement with each other so that the two end parts, when brought together, as shown in FIGURE 7, form substantially a rectangular body. The resilient element 50 may be made of a strong resilient material such as any of several plastic materials or may be made of any suitable metal or metal composition. It is to be understood that the designation "plastic" is intended to include such composition as rubber and glass and fiber glass reinforced material. The important thing about the material employed is that the ring made therefrom is resilient and the material has sufficient strength to serve as a thrust bearing to hold the members 10 and 20 securely together. Where the material is a low friction material, as in the case of certain plastics, or lubricant bearing metals, the added advantage exists of enhancing the free rotative movement of member 10 of member 20.

Figure 5:
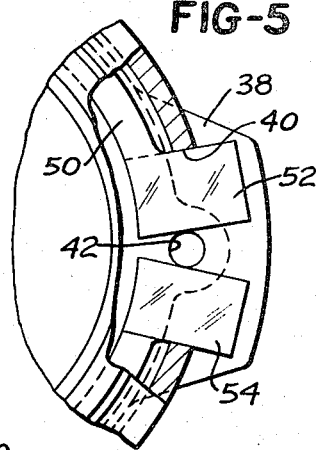
FIGURE 5 is a fragmentary sectional view indicated by line V—V on FIGURE 4.

For effecting interconnection of members 10 and 20, ring 50 is first placed into groove 34 of member 10 with the ends of the ring extending outwardly through aperture 40. A ring in such a position is shown in vertical cross section in FIGURE 4 and in partial plan in FIGURE 5.

Figure 4:
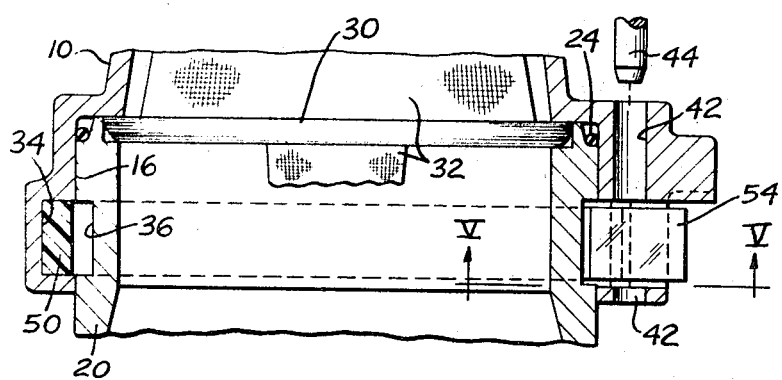
FIGURE 4 is a fragmentary view showing the region of interconnection of the two members making up the coupling in disconnected relation.

It will be particularly noted in FIGURE 4 that the cross section of ring 50 is completely received within the depth of annular groove 34 so that there is no obstruction presented by the ring to the entry into bore 16 of the cylindrical end 18 of member 20. After the end 18 of member 20 is placed in bore 16 of member 10 as shown in FIGURE 4, the ends 52 and 54 of ring 50 are drawn together from their FIGURES 5 and 6 position to their FIGURES 2 and 7 position and, upon placing the drawn together ends in one end of aperture 40, the pin 44 can be pushed into position and the ends will then be locked tightly together.

At this time, the body of ring 50 is disposed so that it closely embraces the bottom of groove 36 of member 20 but projects radially outwardly from groove 36 into groove 34 so that about one half of the radial extent of the ring 50 is disposed in each of the said grooves 34 and 36. It will be evident that the machining of both of members 10 and 20 to provide for ring 50 is extremely simple and inexpensive and that the ring itself can be made quite simply and inexpensively by conventional molding or casting.

It will be evident that the ends of the split ring 50 can normally be drawn together manually but, in the event the ring is extremely stiff, it would be a simple matter to draw the ends of the ring together by the use of a pair of pliers or a similar tool. In either case, the overhanging portion 38 of adapter 10 protects the end portions 52 and 54 of ring 50 against damage so that it is extremely unlikely that anything will ever strike the ends and break them off from the ring and permit the two parts of the coupling accidently to become disconected, even when the ring is made of relatively stiff, brittle material.

It will be evident that the arrangement of the present invention permits the two parts of the coupling, namely adapter member 10 and fitting member 20, to be quickly connected and disconnected. The strainer screen is thus readily accessible at any time that it is necessary to clean or replace this screen. Similarly, the hose or conduit can be disconnected from adapter 10 and another quickly connected thereto. In every case, the ring 50 not only provides means by which the connection and disconnection can easily and quickly be made, but at the same time extremely securely connects the parts together and permits swivelling movement therebetween.

It will be understood that this invention is susceptible to modification in order to adapt it to different usages and conditions; and accordingly, it is desired to comprehend such modification within this invention as may fall within the scope of the appended claims.

What is claimed is:

1. A separable coupling for conveying fluid and comprising: a first tubular part having one end adapted for connection to a receiver such as a tank and a second tubular part having one end adapted for connection to the end of a hose, said first part having a cylindrical recess in its other end with a radial shoulder at the bottom, said second part having a cylindrical region at its other end adapted for being telescopically received in said recess with the outer end of said region engaging said shoulder, annular grooves of substantial axial length formed in said recess and on said cylindrical region which register when the outer end of said cylindrical region of said second part engages the shoulder at the bottom of the recess in said first part, each recess being rectangular in cross section, a strip of material formed into a ring and having a cross section substantially the same as that of the groove in said recess, the ends of said strip being spaced apart and formed to extend radially outwardly, a circumferentially extending radial aperture in said first part leading into the said groove in the first part and adapted to receive the ends of said ring when the ring is placed in the groove in said first part, said ring when relaxed being disposed entirely outside the radial confines of said recess in said first part with the said ends thereof disposed at respective ends of said aperture, said ends of the ring projecting outwardly from the outer surface of said first part for manual manipulation thereof, said ends being spaced apart such a distance that when they are drawn together at one end of said aperture said ring will be contracted so as to have a radial portion in each said groove thereby holding said first and second parts together while permitting said parts to rotate relatively, and retaining means carried by said first part adapted for selective adjustment into position to confine said ends of said ring to one end of said aperture.

2. A separable coupling according to claim 1 in which said first part comprises rib-like projections at the axial ends of said aperture to shield said ends of said ring, and said retaining means comprising axially aligned holes formed in said projections and a pin receivable in said holes when said ends of the ring are both positioned in one end of said aperture to retain the said ends of the ring at the said one end of the aperture.

3. A separable coupling according to claim 2 in which said axially aligned holes are in about the middle of the circumferential extent of said aperture and said ends of said ring can be retained in either end of said aperture when drawn together therein and the pin placed in said holes.

4. A separable coupling according to claim 2 in which each of the radially inner and outer corners of said outer end of the cylindrical region of said second part is provided with a notch having a radial wall and an axial wall, a resilient seal ring in the notch in the radially outer corner for sealing between said parts when the parts are assembled, and a screen in said first part having a radial flange disposed in the notch in the radially inner corner and confined therein between the radial wall of the respective notch and said shoulder at the bottom of the recess in said first part.

5. A separable coupling according to claim 4 in which the axial wall of the notch in the said radially outer corner of the outer end of said cylindrical region of said second part is convergent with the wall of said cylindrical recess in said second part in a direction away from said shoulder.

6. A separable coupling according to claim 1 in which said ends of said ring have the sides thereof facing each other provided with complementary bevels which are in face to face engagement when the said ends are drawn together, said ends when drawn together at one end of said aperture and confined therein by said retaining means substantially filling the axial and radial extent of the aperture on one side of said retaining means.

References Cited

UNITED STATES PATENTS

| | | | |
|---|---|---|---|
| 472,342 | 4/1892 | Draudt | 285—321 |
| 2,658,625 | 11/1953 | Rafferty | 210—170 |
| 2,805,089 | 9/1957 | Hansen | 285—317 |
| 3,280,982 | 12/1962 | Barto | 210—315 |
| 3,314,696 | 4/1967 | Ferguson et al. | 285—174 |

REUBEN FRIEDMAN, *Primary Examiner.*

T. A. GRANGER, *Assistant Examiner.*

U.S. Cl. X.R.

210—497; 285—276, 321